Patented Jan. 9, 1945

2,367,002

UNITED STATES PATENT OFFICE 2,367,002

COMPOSITION OF MATTER AND METHOD OF PRODUCING

William P. Campbell, Newark, Del., assignor to Hercules Powder Company, Wilmington, Del., a corporation of Delaware No Drawing. Application June 27, 1942, Serial No. 448,870

15 Claims. (Cl. 260—97)

This invention relates to new compositions of matter and methods of producing them. More particularly, it relates to halogenated dehydroabietic acid compounds and to methods for their production.

While many derivatives of dehydroabietic acid have been described in the art, no mention has been made of the halogenated derivatives containing halogen in the aromatic ring of the dehydroabietic acid nucleus.

Now, in accordance with this invention, it has been discovered that halogenated derivatives of dehydroabietic acid having many interesting characteristics and useful for a variety of purposes may be produced. The halogenated dehydroabietic acid compounds which form the basis of this invention may be expressed by the following general formula:

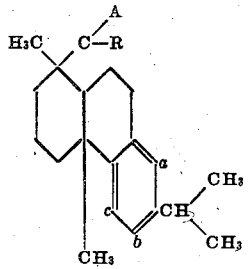

wherein A is a bivalent element or group such as O, S, H₂, NX, where X is hydrogen or a monovalent organic radical; R is a monovalent element or group such as OH, H, SH, O—metal, O—NH₄, halogen, OSO₃H, OSO₃—metal, OX, SX, NXX, where X is hydrogen or a monovalent organic radical; a and/or b and/or c are either hydrogen or a halogen, and no more than two of a, b and c are hydrogens.

Thus, in general, the halogenated derivatives of dehydroabietic acid which are prepared in accordance with this invention may or may not be substituted in the carboxyl group and will be substituted in the aromatic ring of the dehydroabietic acid, or compound containing the hydrocarbon nucleus of dehydroabietic acid with halogen.

The method of producing the halogenated dehydroabietic acid compounds in accordance with this invention comprises treating a sulfonated dehydroabietic acid or a sulfonated dehydroabietic acid compound containing the hydrocarbon nucleus of dehydroabietic acid with a halogen under conditions adapted to provide substitution of the sulfonic group or groups with halogen.

As illustrative of the process of the invention and of the halogenated dehydroabietic acid compounds which comprise the new compositions of the invention, the following specific examples are cited. All parts expressed in the examples represent parts by weight unless otherwise indicated.

Example I

A solution of 29 parts of bromine and 40 parts of sodium bromide in 1000 parts of water was added gradually over a three hour period with stirring to a solution of 45 parts of mono sulfodehydroabietic acid in 1000 parts of water at a temperature of 95 to 100° C. The heavy white precipitate of mono bromodehydroabietic acid which formed was separated by filtration, washed thoroughly with hot water, and dried. The yield of a nearly pure mono bromo acid was 36 parts by weight or 92% of the theoretical. Its melting point was 198–200° C. It was crystallized from aqueous ethyl alcohol, giving a purified material having a melting point of 200–202° C., a neutral equivalent of 375, and a specific optical rotation at 25° C. of +81° (.80 g. per 100 cc. of ethyl alcohol).

Example II

Ten parts of the mono bromodehydroabietic acid obtained in Example I were dissolved in anhydrous ether and treated with 6 parts of thionyl chloride and .1 part of pyridine. After standing for 1 hour, the solution was washed with dilute sodium hydroxide until alkaline, dried, the ether removed, and the oily residue heated at 100° C. in vacuo for 11 hours. The mono bromodehydroabietoyl chloride which was formed had a melting point of 103° C.

Example III

Forty-five parts of methyl sulfodehydroabietate (prepared by sulfonating methyl dehydroabietate) dissolved in 1500 parts of water was treated with 30 parts of liquid bromine. The bromo ester precipitated and was isolated by extraction with ether and evaporation of the ether extract.

The sulfonated dehydroabietic acid or sulfonated dehydroabietic acid compounds which are useful in the process of this invention may be prepared according to the sulfonation method disclosed in U. S. Patent 2,207,890 to Edwin R. Littmann.

In carrying out the halogenation process of the invention, the sulfonic acid radical or radicals of the sulfonated dehydroabietic acid compound will become substituted by a halogen atom. The halogenation of the sulfonated dehydroabietic acid compounds gives the corresponding halogenated products in very high yields. The halogenation process will desirably be carried out on a solution of a sulfonated dehydroabietic acid compound in water or in an aqueous solvent such as aqueous alcohol, aqueous acetic acid, etc. The concentration of the sulfonated dehydroabietic acid compound in the solvent is not critical and may be within the range of about 1% by weight to the saturation point of the solvent. The halogens which may be utilized are preferably bromine and chlorine. Iodine and fluorine are less satisfactory due to poorer yields obtainable from them. The temperature which may be used in carrying out the halogenation reaction will depend on the particular solvent which is used. Generally speaking, the temperature will be within the range from about 60° to about 120° C. and preferably about 80° C. to about 100° C. The amount of halogen utilized will be at least sufficient to replace the sulfonic acid group or groups of the sulfonated dehydroabietic acid compound being treated. Usually an excess of this amount will be desirable. It is also desirable in some instances to include the corresponding alkali halide along with the halogen.

The halogenation treatment may, as described above, be carried out on any of the sulfonated dehydroabietic acid compounds containing the hydrocarbon nucleus of dehydroabietic acid in which the substituents in the carboxyl group are any of those included by the general formula appearing above. Alternatively, the halogenated product obtained may be subsequently treated to alter the substituent in the carboxyl group to provide the halogenated products defined by the general formula above, as illustrated by Example II.

The halogenated products described in accordance with this invention are useful as intermediate materials in the production of dehydroabietic acid derivatives such as the hydroxyl derivatives and the amino derivatives. They are also useful for other purposes such as, for example, in greases, insecticides, special lubricants, etc.

What I claim and desire to protect by Letters Patent is:

1. As new compositions of matter, halogenated compounds derived from dehydroabietic acid having the following general formula:

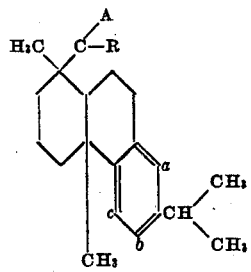

in which A is selected from the group consisting of O, S, H$_2$, NX, where X is selected from the group consisting of hydrogen and a monovalent organic radical; R is selected from the group consisting of OH, H, SH, O—metal, O—NH$_4$, halogen, OSO$_3$H, OSO$_3$—metal, OX, SX, NXX, where X is selected from the group consisting of hydrogen and a monovalent organic radical; and in which each of $a$, $b$, $c$ is a substituent selected from the group consisting of hydrogen and a halogen, and in which no more than two of $a$, $b$ and $c$ are hydrogen.

2. As a new composition of matter, dehydroabietic acid having a halogen substituent in its aromatic nucleus.

3. As a new composition of matter, dehydroabietic acid having one halogen substituent in its aromatic nucleus.

4. As a new composition of matter, an ester of dehydroabietic acid containing a halogen substituent in its aromatic nucleus.

5. As a new composition of matter, an ester of dehydroabietic acid containing one halogen substituent in its aromatic nucleus.

6. As a new composition of matter, dehydroabietoyl halide having a halogen substituent in its aromatic nucleus.

7. As a new composition of matter, dehydroabietic acid having one bromine substituent in its aromatic nucleus.

8. As a new composition of matter, an ester of dehydroabietic acid containing one bromine substituent in its aromatic nucleus.

9. As a new composition of matter, dehydroabietoyl chloride having one bromine substituent in its aromatic nucleus.

10. The method of producing a halogenated dehydroabietic acid compound containing the hydrocarbon nucleus of dehydroabietic acid as defined by claim 1 which comprises halogenating a dehydroabietic acid compound containing the hydrocarbon nucleus of dehydroabietic acid and having a sulfonic acid group in its aromatic nucleus.

11. The method of producing a halogenated dehydroabietic acid which comprises halogenating dehydroabietic acid having a sulfonic acid group in its aromatic nucleus.

12. The method of producing a mono halogenated dehydroabietic acid which comprises halogenating dehydroabietic acid having one sulfonic acid group in its aromatic nucleus.

13. The method of producing a halogenated dehydroabietic acid ester which comprises halogenating an ester of dehydroabietic acid containing a sulfonic group in its aromatic nucleus.

14. The method of producing mono bromodehydroabietic acid which comprises brominating dehydroabietic acid having one sulfonic acid group in its aromatic nucleus.

15. The method of producing a mono bromo-dehydroabietic acid ester which comprises brominating an ester of dehydroabietic acid containing a sulfonic group in its aromatic nucleus.

WILLIAM P. CAMPBELL.

CERTIFICATE OF CORRECTION.

Patent No. 2,367,002. January 9, 1945.

WILLIAM P. CAMPBELL.

It is hereby certified that error appears in the printed specification of the above numbered patent requiring correction as follows: Page 2, second column, lines 54 and 62, after the word "sulfonic" insert --acid--; and that the said Letters Patent should be read with this correction therein that the same may conform to the record of the case in the Patent Office.

Signed and sealed this 15th day of May, A. D. 1945.

Leslie Frazer (Seal) Acting Commissioner of Patents.